US012099535B2

(12) United States Patent
Morimoto

(10) Patent No.: US 12,099,535 B2
(45) Date of Patent: Sep. 24, 2024

(54) METHOD, SYSTEM, AND DEVICE FOR EVALUATING PERFORMANCE OF DOCUMENT SEARCH

(71) Applicant: Shimadzu Corporation, Kyoto (JP)

(72) Inventor: Kentaro Morimoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 18/008,736

(22) PCT Filed: Mar. 4, 2021

(86) PCT No.: PCT/JP2021/008353
§ 371 (c)(1),
(2) Date: Dec. 7, 2022

(87) PCT Pub. No.: WO2021/250950
PCT Pub. Date: Dec. 16, 2021

(65) Prior Publication Data
US 2023/0244705 A1 Aug. 3, 2023

(30) Foreign Application Priority Data

Jun. 11, 2020 (JP) .................. 2020-101523

(51) Int. Cl.
*G06F 16/33* (2019.01)
*G06F 16/332* (2019.01)

(52) U.S. Cl.
CPC ........ *G06F 16/334* (2019.01); *G06F 16/3326* (2019.01)

(58) Field of Classification Search
CPC ............. G06F 16/334; G06F 16/3326
See application file for complete search history.

(56) References Cited

U.S. PATENT DOCUMENTS 6,654,742 B1 * 11/2003 Kobayashi .............. G06F 16/30
707/999.005
2012/0303611 A1 * 11/2012 Kusumura ............ G06F 16/355
707/E17.014

(Continued)

FOREIGN PATENT DOCUMENTS

CN 101128818 A * 2/2008 ............. G06F 16/33
JP 2003-099439 A 4/2003

(Continued)

OTHER PUBLICATIONS

PCT Written Opinion of the International Searching Authority for PCT application No. PCT/JP2021/008353 dated Jun. 1, 2021.

(Continued)

*Primary Examiner* — Hosain T Alam
*Assistant Examiner* — Robert F May
(74) *Attorney, Agent, or Firm* — Muir Patent Law, PLLC

(57) ABSTRACT

Degradation in performance of document search is automatically detected. When document data is added to a database, a learning unit updates a language model by machine learning. A performance evaluation unit respectively calculates a first statistical value and a second statistical value related to ranking of each of a plurality of specific document data from a result of the document search using each of a plurality of first labels and second labels attached to a plurality of specific document data as a search query. The performance evaluation unit detects the degradation in performance of the document search when a variation value of the first statistical value due to update of a language model accompanying addition of at least one piece of document data is larger than a first threshold, and when a variation value of the second statistical value due to update is larger than a second threshold.

8 Claims, 13 Drawing Sheets

(56) References Cited

U.S. PATENT DOCUMENTS

| | | | | |
|---|---|---|---|---|
| 2014/0040275 A1* | 2/2014 | Dang | ............... | G06F 40/30 |
| | | | | 707/741 |
| 2015/0292197 A1* | 10/2015 | Miller | ............... | E06B 7/2316 |
| | | | | 49/489.1 |
| 2017/0177712 A1* | 6/2017 | Kopru | ............... | G06F 16/3337 |
| 2020/0409963 A1* | 12/2020 | Higashi | ............... | G06F 16/3334 |
| 2022/0035846 A1 | 2/2022 | Morimoto | | |

FOREIGN PATENT DOCUMENTS

| | | |
|---|---|---|
| JP | 2003-115010 A | 4/2003 |
| JP | 2008-293534 A | 12/2008 |
| JP | 2019-125220 A | 7/2019 |
| WO | 2020/080376 A1 | 4/2020 |
| WO | WO-2020079748 A1 * | 4/2020 |

OTHER PUBLICATIONS

Notice of Reasons for Refusal dated Oct. 24, 2023 for corresponding Japanese Patent Application No. 2022-530027.

* cited by examiner

FIG.6

```
SEARCH RESULT IN WHICH "NUCLEIC ACID" IS USED AS SEARCH QUERY

RANK            ANALYSIS CASE NAME

1    ANALYSIS OF NUCLEIC ACID RELATED COMPOUND IN FISH MEAT
       AND AUTOMATIC CALCULATION OF FRESHNESS (K VALUE) USING
       MULTIDATA REPORT                                    ~D5

2    MEASUREMENT OF TOTAL PURINE BODY AMOUNT IN FOOD BY HPLC
                                                           ~D1

3    ANALYSIS OF NUCLEIC ACID DERIVATIVE BY LCMS
                                                           ~D9

4    HPLC ANALYSIS OF PURINE BODY USING PEAK SHIFT METHOD BY
       ENZYME REACTION                                     ~D3

5    DEGRADATION ANALYSIS OF ALCOHOL USING FOOD METABOLOMICS
       LC/MS/MS                                            ~D2

6    HIGH-SENSITIVITY PURINE BODY ANALYSIS IN ALCOHOL DRINK USING
       HYDROPHILIC INTERACTION CHROMATOGRAPH-MASS SPECTROMETER
                                                           ~D6

7    PRECISION MASS SPECTROMETRY OF FLAVONOIDS BY LCMS-IT-TOF
                                                           ~D7

8    LC/MS/MS ANALYSIS OF VITAMIN D3 BY HIGH-SENSITIVITY IMPURITY
       QUANTIFICATION SYSTEM                               ~D8

9    ANALYSIS OF CARBADOX QUINOXALINE-2-CARBOXYLIC ACID IN
       PORK BY LC-MS                                       ~D4

10    ANALYSIS OF PHOSPHATE GROUP CONTAINING COMPOUND USING
       HIGH-VOLTAGE STAINLESS FREE LC COLUMN               ~D10

11    ANALYSIS OF HISTAMINE AND TYRAMINE BY AMINO ACID ANALYSIS
       SYSTEM                                              ~D11
                             ⋮
```

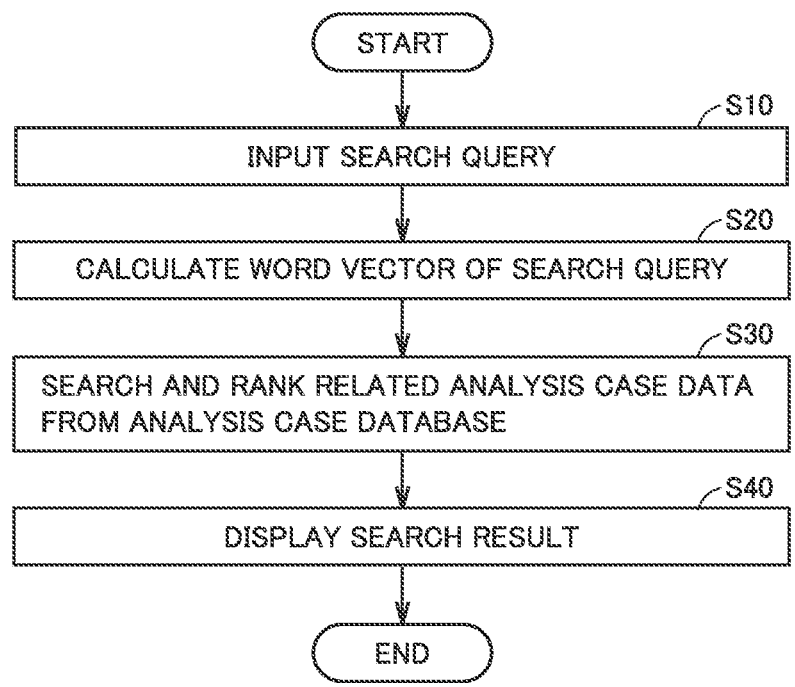

FIG.8

| SECOND LABEL | FIRST LABEL | IDENTIFIER OF SPECIFIC ANALYSIS CASE DATA |
|---|---|---|
| CA | Ca1 | Da11 |
| | | Da12 |
| | | Da13 |
| | | ⋮ |
| | Ca2 | Da21 |
| | | Da22 |
| | | Da23 |
| | | ⋮ |
| | ⋮ | ⋮ |
| ⋮ | ⋮ | ⋮ |
| NUCLEIC ACID | PURINE BODY | D1 |
| | | D3 |
| | | D6 |
| | | ⋮ |
| | Cb1 | D5 |
| | | ⋮ |
| | Cb2 | D9 |
| | | ⋮ |
| | ⋮ | ⋮ |

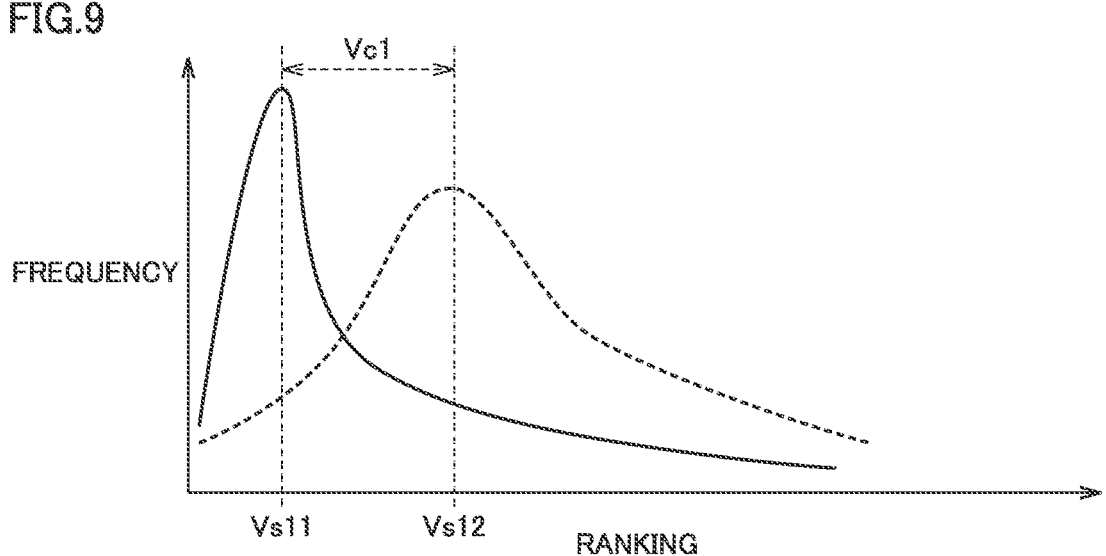
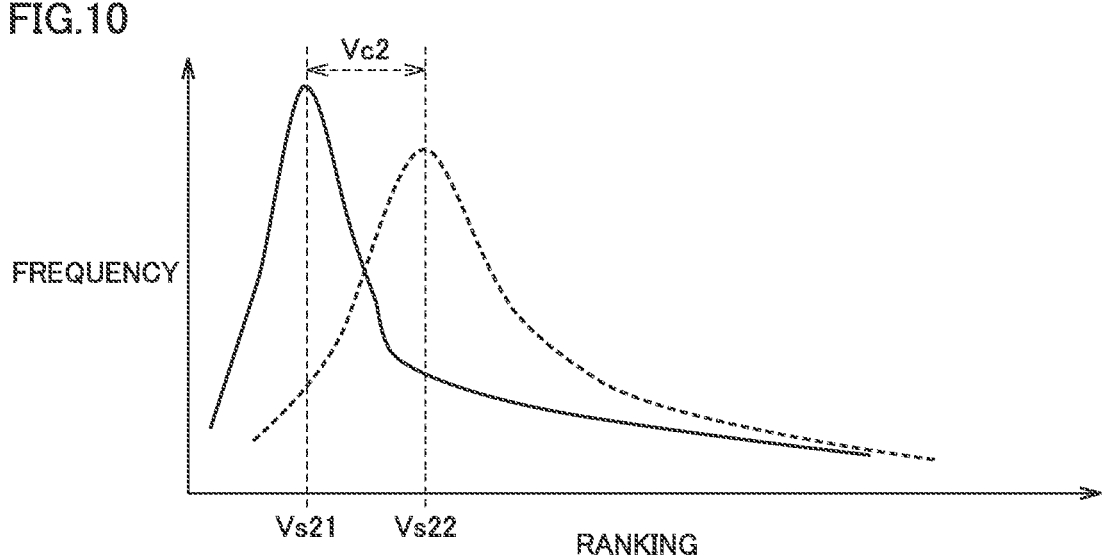

METHOD, SYSTEM, AND DEVICE FOR EVALUATING PERFORMANCE OF DOCUMENT SEARCH

TECHNICAL FIELD

The present invention relates to a method, a system, and a device for evaluating performance of document search.

BACKGROUND ART

Conventionally, a configuration for searching desired information from a database is known. For example, Japanese Patent Laid-Open No. 2003-99439 (PTL 1) discloses an analysis processing method search device that holds various analysis processing methods as a database, and searches for and displays a desired analysis processing method from the database. According to the analysis processing method search device, a keyword that is easy to intuitively grasp is set as attribute data characterizing the analysis processing method, so that the analysis processing method suitable for the target processing can be easily searched using the attribute data as a search key.

CITATION LIST

Patent Literature

PTL 1: Japanese Patent Laying-Open No. 2003-99439

SUMMARY OF INVENTION

Technical Problem

Because sometimes new information is added to the database including the information of the search target, a search result using a search query may change depending on search timing even when the search query is the same. Depending on the information added to the database, a tendency of the information included in the database rapidly changes, and document data having a relatively low relevance to the search query can be ranked high. However, in the analysis processing method search device disclosed in PTL 1, degradation in performance of document search associated with a change in tendency of the information included in the database is not considered.

The present invention has been made to solve such a problem, and an object of the present invention is to automatically detect the degradation in the performance of the document search.

Solution to Problem

A method according to an aspect of the present invention searches a plurality of related document data related to a search query from a database including a plurality of document data, and evaluates performance of document search ranking the plurality of related document data in accordance with a relevance degree between each of the plurality of related document data and the search query. The relevance degree is calculated based on a feature of each of the plurality of document data extracted by a language model generated by machine learning using the database and a feature of the search query extracted by the language model. A first label related to the specific document data and a second label that is a superordinate concept of the first label is previously attached to each of a plurality of specific document data included in the plurality of document data. The method includes: updating the language model by the machine learning when at least one piece of document data is added to the database; calculating a first statistical value related to a ranking of each of the plurality of specific document data from a result of the document search in which each of a plurality of first labels attached to the plurality of specific document data is used as the search query; calculating a second statistical value related to a ranking of each of the plurality of specific document data from a result of the document search in which each of a plurality of second labels attached to the plurality of specific document data is used as the search query; and detecting degradation in the performance when a variation value of the first statistic value due to the update of the language model in association with the addition of the at least one document data is greater than a first threshold and when a variation value of the second statistic value due to the update is greater than a second threshold.

A system according to another aspect of the present invention searches a plurality of related document data related to a search query from a database including a plurality of document data, and evaluates performance of document search ranking the plurality of related document data in accordance with a relevance degree between each of the plurality of related document data and the search query. The relevance degree is calculated based on a feature of each of the plurality of document data extracted by a language model generated by machine learning using the database and a feature of the search query extracted by the language model. A first label related to the specific document data and a second label that is a superordinate concept of the first label is previously attached to each of a plurality of specific document data included in the plurality of document data. The system includes a terminal device and a server device. A search query is input to the terminal device. The server device receives the search query from the terminal device to perform the document search. The server device includes a learning unit and a performance evaluation unit. When at least one piece of document data is added to the database, the learning unit updates the language model by machine learning. The performance evaluation unit evaluates the performance of the document search. The performance evaluation unit calculates a first statistical value related to a ranking of each of the plurality of specific document data from a result of the document search in which each of a plurality of first labels attached to the plurality of specific document data is used as the search query. The performance evaluation unit calculates a second statistical value related to a ranking of each of the plurality of specific document data from a result of the document search in which each of a plurality of second labels attached to the plurality of specific document data is used as the search query. The performance evaluation unit detects degradation in the performance when a variation value of the first statistic value due to the update of the language model in association with the addition of the at least one document data is greater than a first threshold and when a variation value of the second statistic value due to the update is greater than a second threshold.

A device according to another aspect of the present invention searches a plurality of related document data related to a search query from a database including a plurality of document data, and evaluates performance of document search ranking the plurality of related document data in accordance with a relevance degree between each of the plurality of related document data and the search query. The relevance degree is calculated based on a feature of each of the plurality of document data extracted by a language model generated by machine learning using the database and a feature of the search query extracted by the language model. A first label related to the specific document data and a second label that is a superordinate concept of the first label is previously attached to each of a plurality of specific document data included in the plurality of document data. The device includes an input and output unit, a search unit, a learning unit, and a performance evaluation unit. The search query is input to the input and output unit. The search unit receives the search query to perform the document search. When at least one piece of document data is added to the database, the learning unit updates the language model by machine learning. The performance evaluation unit evaluates the performance of the document search. The performance evaluation unit calculates a first statistical value related to a ranking of each of the plurality of specific document data from a result of the document search in which each of a plurality of first labels attached to the plurality of specific document data is used as the search query. The performance evaluation unit calculates a second statistical value related to a ranking of each of the plurality of specific document data from a result of the document search in which each of a plurality of second labels attached to the plurality of specific document data is used as the search query. The performance evaluation unit detects degradation in the performance when a variation value of the first statistic value due to the update of the language model in association with the addition of the at least one document data is greater than a first threshold and when a variation value of the second statistic value due to the update is greater than a second threshold.

Advantageous Effects of Invention

According to the method, the system, and the device of the present invention, when the variation value of the first statistical value due to the update of the language model in association with the addition of at least one document data is larger than the first threshold and when the variation value of the second statistical value due to the update is larger than the second threshold, the degradation in the performance of the document search is detected, whereby the degradation in the performance of the document search can be automatically detected.

BRIEF DESCRIPTION OF DRAWINGS

FIG. 6 is a view illustrating an example of the search result window displayed on the display in FIG. 1 when the search query is a "nucleic acid".

FIG. 7 is a view illustrating a schematic flow of search processing performed in the analysis case search system in FIG. 1.

FIG. 8 is a view illustrating a structure in which a first label, a second label, and an identifier of specific analysis case data are associated, the structure being formed in a test query database.

FIG. 9 is a view illustrating a distribution curve of a frequency of rankings of a plurality of specific analysis case data when each of a plurality of first labels is used as the search query.

FIG. 10 is a view illustrating the distribution curve of the frequency of the rankings of the plurality of specific analysis case data when each of a plurality of second labels is used as the search query.

DESCRIPTION OF EMBODIMENT

Figure 1:
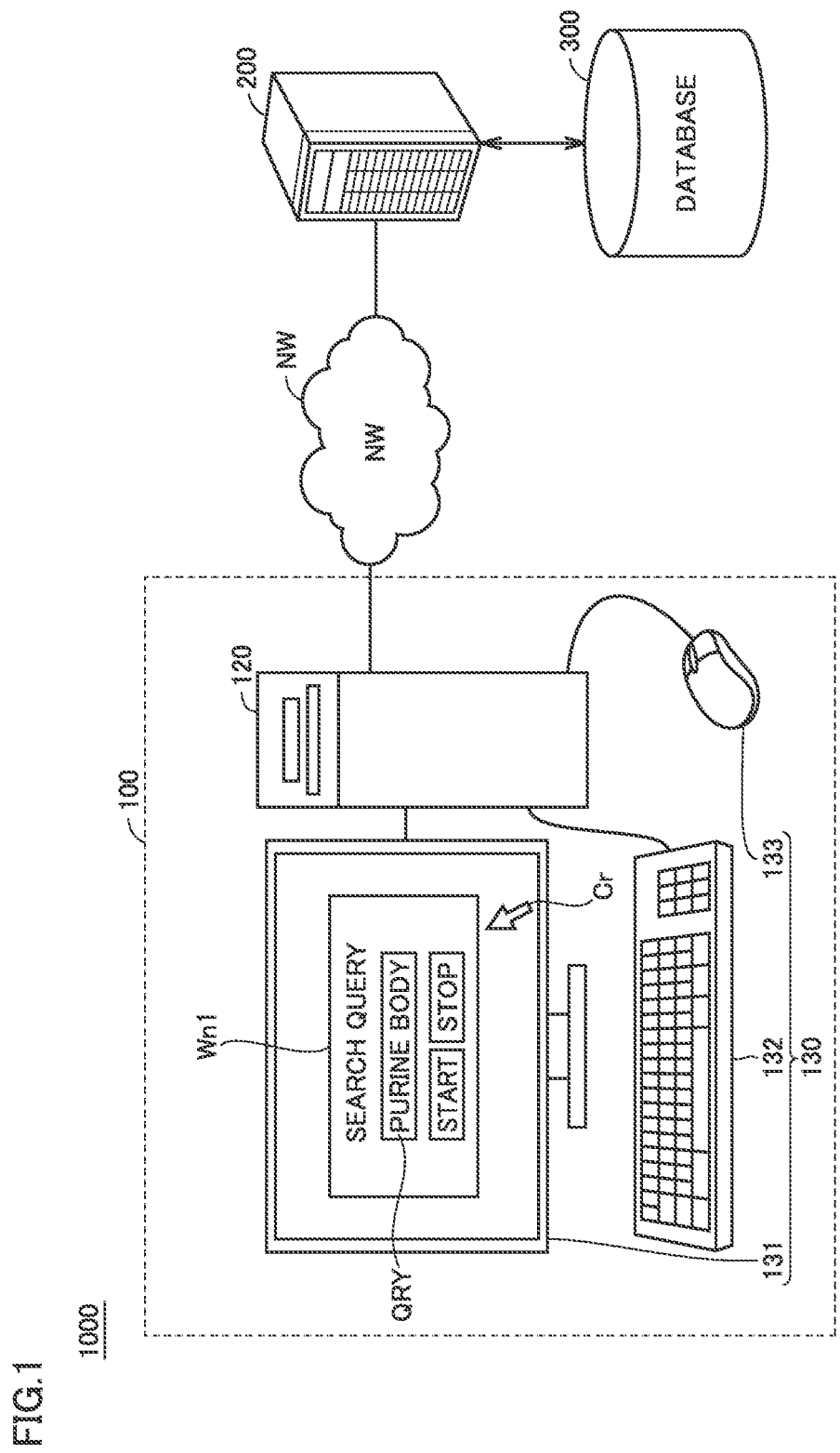
FIG. 1 is a block diagram illustrating a configuration of an analysis case search system as an example of a document search system according to an embodiment.

Hereinafter, an embodiment will be described in detail with reference to the drawings. In the drawings, the same or corresponding portions are denoted by the same reference numeral, and the description will not be repeated in principle.

FIG. 1 is a block diagram illustrating a configuration of an analysis case search system 1000 as an example of a document search system of the embodiment. As illustrated in FIG. 1, analysis case search system 1000 includes a terminal device 100, a server device 200, and a database 300. Terminal device 100 and server device 200 are connected to each other through a network NW. Database 300 includes a plurality of analysis case data (document data). For example, network NW includes the Internet, a wide area network (WAN), or a local area network (LAN).

Terminal device 100 includes a computer 120 and an input and output unit 130. Input and output unit 130 includes a display 131, a keyboard 132, and a mouse 133. Display 131, keyboard 132, and mouse 133 are connected to computer 120.

A search window Wn1 and a cursor Cr are displayed on display 131. A user operates cursor Cr by operating mouse 133. The user inputs a search query QRY into search window Wn1 by operating keyboard 132. FIG. 1 illustrates a case where the user inputs a character string "purine body" as search query QRY to search window Wn1 in order to search the analysis case data (document data) in which an analysis device, an analysis method, an analysis condition, and the like suitable for analysis of the purine body are described.

In analysis case search system 1000, the search query input by the user is transmitted from terminal device 100 to server device 200 through network NW. Server device 200 searches a plurality of relevant analysis case data (related document data) related to search query QRY from database 300. Server device 200 ranks each of the plurality of relevant analysis case data in accordance with a degree of relevance with search query QRY, and transmits the search result to terminal device 100. Terminal device 100 displays the plurality of relevant analysis case data in order of rank based on the search result from server device 200.

Figure 2:
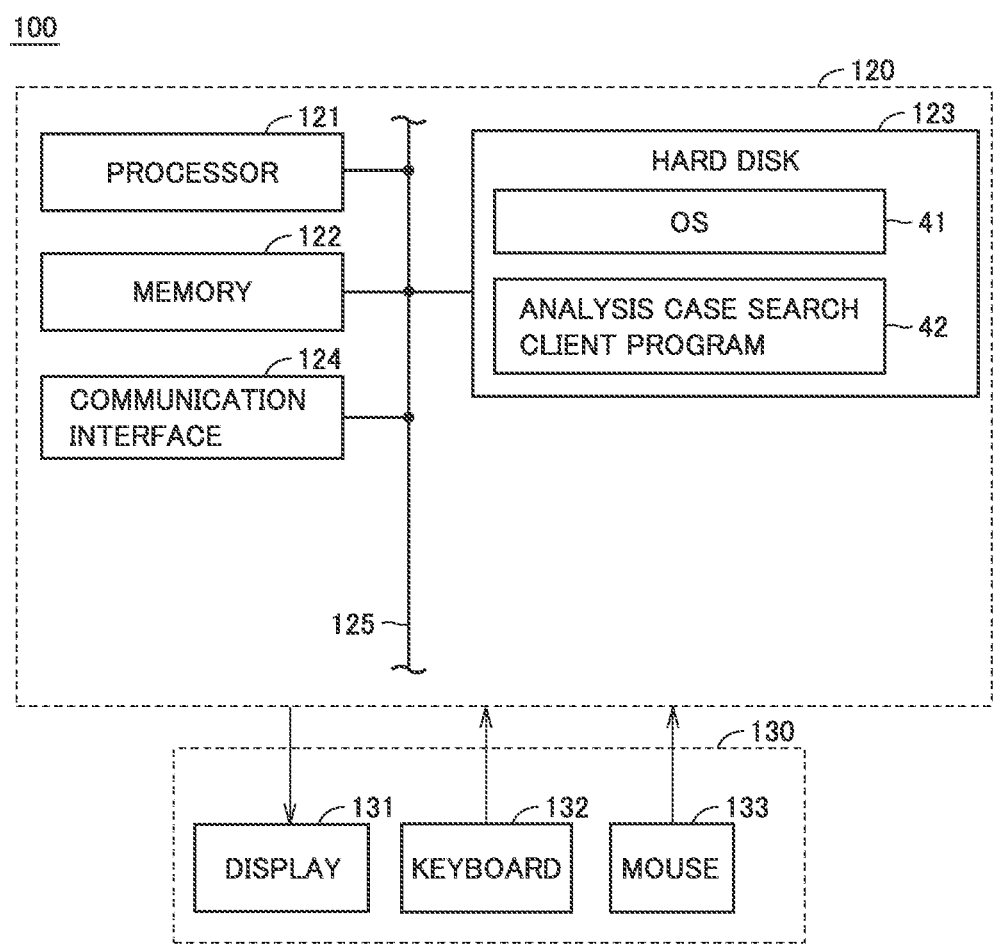
FIG. 2 is a block diagram illustrating hardware configurations of a computer and an input and output unit in FIG. 1.

FIG. 2 is a block diagram illustrating hardware configurations of computer 120 and input and output unit 130 in FIG. 1. As illustrated in FIG. 2, computer 120 includes a processor 121, a memory 122 and a hard disk 123 as a storage, and a communication interface 124. These are communicably connected to each other through a bus 125.

Hard disk 123 is a non-volatile storage device. For example, hard disk 123 stores a program 41 of an operating system (OS) and a client program 42 of an analysis case search application. In addition to the data in FIG. 2, for example, settings and outputs of various applications are stored in hard disk 123. Memory 122 is typically a volatile storage device such as a dynamic random access memory (DRAM).

Processor 121 includes a central processing unit (CPU). Processor 121 may further include a graphics processing unit (GPU). Processor 121 reads a program stored in hard disk 123 into memory 122 and executes the program. Processor 121 is connected to network NW through communication interface 124.

Input and output unit 130 includes display 131, mouse 133, and keyboard 132. Each of display 131, mouse 133, and keyboard 132 is connected to computer 120. A graphical user interface (GUI) of the analysis case search application is displayed on display 131. While referring to the display on display 131, the user performs desired input to the analytical case search application by operating keyboard 132 or mouse 133.

Figure 3:
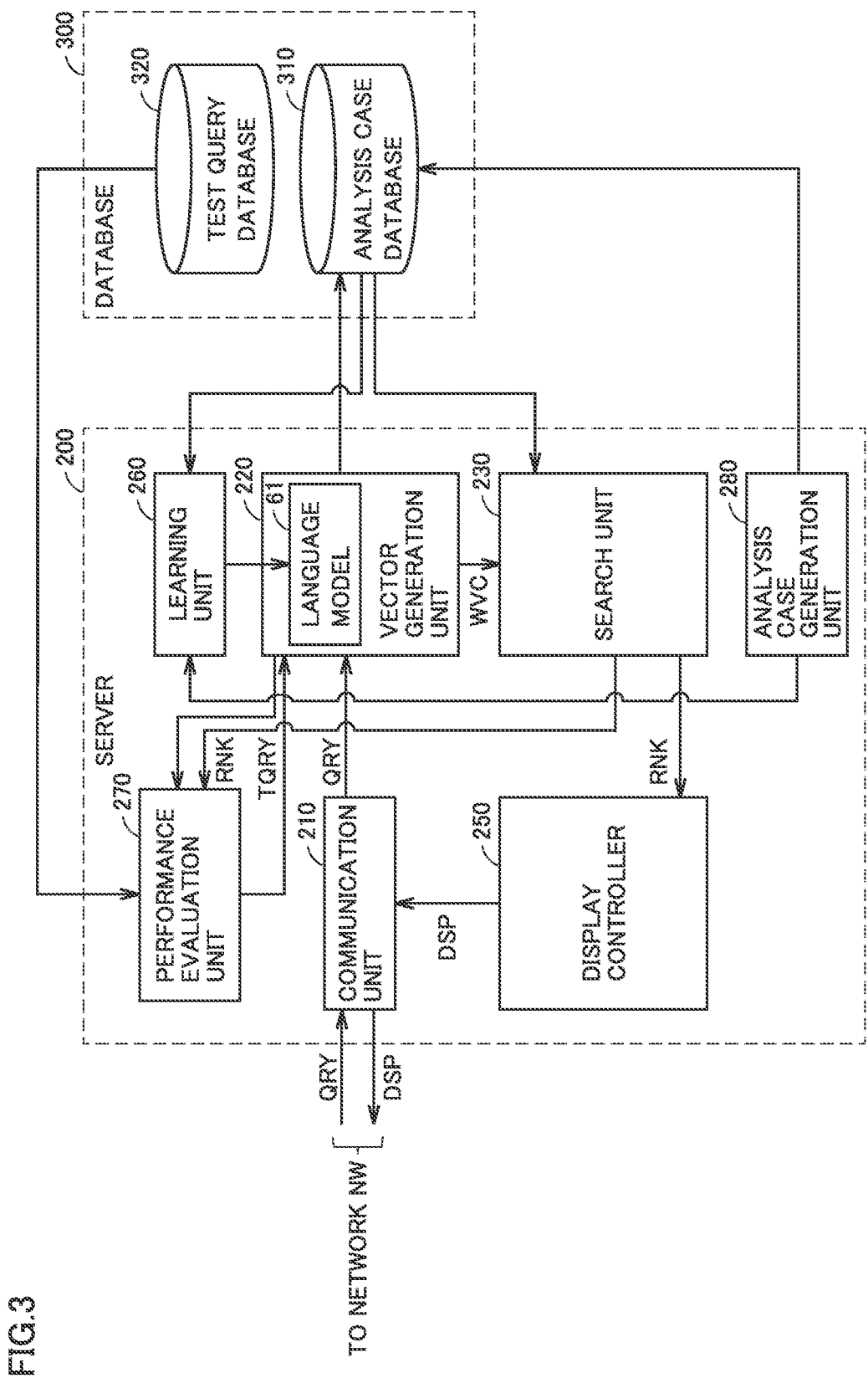
FIG. 3 is a block diagram illustrating functional configurations of a server device and a database in FIG. 1.

FIG. 3 is a block diagram illustrating functional configurations of server device 200 and database 300 in FIG. 1. As illustrated in FIG. 3, server device 200 includes a communication unit 210, a vector generation unit 220, a search unit 230, a display controller 250, a learning unit 260, a performance evaluation unit 270, and an analysis case generation unit 280. Database 300 includes an analysis case database 310 and a test query database 320.

A plurality of analysis case data (an analysis report, a technical paper, a patent literature, and the like) are stored in analysis case database 310 as a search target. The plurality of analysis case data stored in analysis case database 310 may be classified into the analysis case data that can be published to a public and the analysis case data that can be published only to a specific user. Analysis case generation unit 280 generates the new analysis case data and adds the analysis case data to analysis case database 310. Analysis case generation unit 280 may add a plurality of new analysis case data to analysis case database 310 at one time. Analysis case generation unit 280 notifies learning unit 260 that the new analysis case data is added to analysis case database 310. Analysis case generation unit 280 may be formed as a device separate from server device 200. The setting and updating of information in database 200 may be performed automatically every predetermined period of time.

Figure 4:
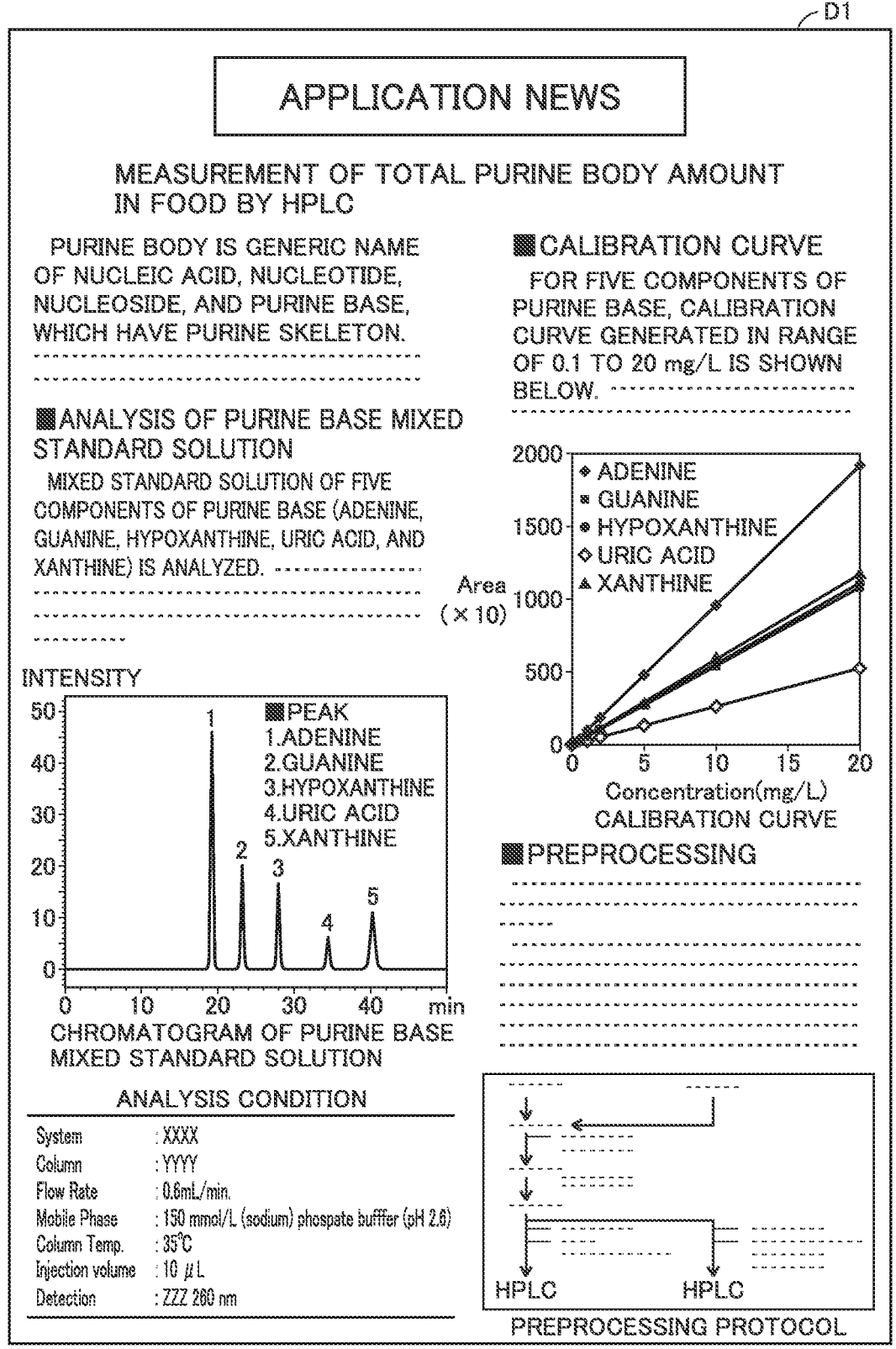
FIG. 4 is a view illustrating analysis case data that is an example of analysis case data included in an analysis case database.

FIG. 4 is a view illustrating analysis case data D1 that is an example of analysis case data included in analysis case database 310. As illustrated in FIG. 4, analysis case data D1 includes information about an analysis case that is the measurement of a total purine body amount in food by a high performance liquid chromatograph (HPLC). In the analysis case, specific compounds to be analyzed are purines such as adenine and guanine. Analysis case data D1 is analysis case data that is desired by the user to be ranked high in the search result of the analysis case search with the "purine body" as search query QRY. In addition, because the purine body is a molecule classified into a nucleic acid, analysis case data D1 is analysis case data that the user desires to be ranked high in the search result even in the search in which the "nucleic acid" that is the superordinate concept of the "purine body" or a compound related to the "nucleic acid" is used as search query QRY.

With reference to FIG. 3 again, learning unit 260 causes a language model 61 to learn a distributed representation (vector) of a specific natural language corresponding to the analysis case data by machine learning using analysis case database 310, and sets language model 61 as a learned model. Analysis case database 310 serves as a corpus in the machine learning. In the machine learning using analysis case database 310, natural language processing including morphological analysis is performed on a plurality of analysis case data included in analysis case database 310. In the morphological analysis, a character string of the analysis target is divided into minimum language units (a morpheme or a word) having meaning. The specific natural language corresponding to the analysis case data is a natural language used to express information included in the analysis case data.

Language model 61 may be a count based language model using a co-occurrence matrix or an inference based language model using a neural network. Examples of the inference based language model include a continuous bag-of-words (CBOW) model and a skip-gram model of word2vec that generate a distributed representation of a word, and a paragraph vector distributed memory (PV-DM) model and a paragraph vector distributed bag-of-words (PV-DBOW) model of doc2vec that generate a distributed representation of a document.

Using learned language model 61, vector generation unit 220 generates a word vector representing a feature of a word included in the analysis case data, a sentence vector representing a feature of a sentence included in the analysis case data, and a document vector representing a feature of a document for each of the plurality of analysis case data included in analysis case database 310. The vector generation unit 220 vectorizes each of the plurality of analysis case data included in analysis case database 310, and stores the data in which the analysis case data is vectorized in analysis case database 310 in association with the analysis case data.

Communication unit 210 receives the information about search query QRY from terminal device 100 through network NW, and outputs search query QRY to vector generation unit 220. Search query QRY is a character string expressed in a natural language.

Vector generation unit 220 divides search query QRY into language units of minimum units by the morphological analysis with respect to search query QRY. Vector generation unit 220 calculates a word vector WVC characterizing the language unit using language model 61. Vector generation unit 220 outputs the information about word vector WVC to search unit 230.

Search unit 230 searches the plurality of relevant analysis case data including a feature similar to word vector WVC from the plurality of analysis case data stored in analysis case database 310. Specifically, for each of the plurality of analysis case data, search unit 230 calculates the degree of relevance between the search query and the analysis case data according to a distance between the vector of search query QRY and the vector of the analysis case data. For example, a cosine distance (cosine similarity) can be cited as an example of the distance. The smaller the distance between the two vectors, the greater the relevance of the two language units respectively represented by the two vectors. Search unit 230 ranks the plurality of relevant analysis case data having the degree of relevance to search query QRY larger than a predetermined threshold among the plurality of analysis case data in accordance with the degree of relevance. Search unit 230 outputs ranking information RNK indicating the ranking of the plurality of relevant analysis case data to display controller 250.

The search performed by search unit 230 is a semantic search that interprets the content of the analysis case desired to be searched from the character string (keyword) included in search query QRY. The semantic search specifies a search target that is matched with the search character string based on semantic expression of the keyword, intention to search, purpose, and the like. That is, the semantic search does not capture the keyword as a simple character string, but captures the keyword as a character string having a meaning including the search request.

In addition, in the search performed by search unit 230, the semantic search and keyword search that searches the analysis case data including the character string matched with the keyword may be integrally used. That is, the degree of relevance between the search query and the analysis case data may be calculated based on the distance between the vector of keywords and the vector of the analysis case data and the number of keywords included in the analysis case data. For example, the analysis case data that includes more keywords may be ranked higher, and the analysis case data that does not include keywords may be ranked lower than the analysis case data that includes keywords by the semantic search. Clarity of the search basis of the semantic search can be improved by integrally using the semantic search and the keyword search.

Display controller 250 produces screen information DSP of the search result displayed on display 131 of terminal device 100 based on ranking information RNK. Display controller 250 transmits screen information DSP to terminal device 100 through communication unit 210. In terminal device 100, names of the plurality of relevant analysis case data are displayed on display 131 in order according to screen information DSP.

Figure 5:
FIG. 5 is a view illustrating an example of a search result window displayed on a display in FIG. 1 when a search query is a "purine body".

FIG. 5 is a view illustrating an example of a search result window Wn2 displayed on display 131 in FIG. 1 when search query QRY is the "purine body". As illustrated in FIG. 5, in search result window Wn2, the names of relevant analysis case data D1 to D11 are displayed together with the rankings 1 to 11 in this order. A hyperlink to the relevant analysis case data is set to the name of each of relevant analysis case data D1 to D11. In the plurality of analysis case data included in analysis case database 310, the analysis case data most relevant to search query QRY "purine body" is D1.

FIG. 6 is a view illustrating an example of search result window Wn2 displayed on display 131 in FIG. 1 when search query QRY is the "nucleic acid". As illustrated in FIG. 6, in search result window Wn2, the names of relevant analysis case data D5, D1, D9, D3, D2, D6 to D8, D4, D10, D11 are displayed together with the rankings 1 to 11 in this order. A hyperlink to the relevant analysis case data is set to the name of each of relevant analysis case data D1 to D11. In the plurality of analysis case data included in analysis case database 310, the analysis case data most relevant to search query QRY "nucleic acid" is D5.

FIG. 7 is a view illustrating a schematic flow of search processing performed in analysis case search system 1000 in FIG. 1. Hereinafter, the step is simply referred to as S. As illustrated in FIG. 7, in S10, the user inputs search query QRY to terminal device 100, and the processing proceeds to S20. In S20, vector generation unit 220 calculates the vector of search query QRY and advances the processing to S30. In S30, search unit 230 searches the plurality of related analysis case data related to search query QRY from analysis case database 310, ranks the plurality of related analysis case data, and advances the processing to S40. In S40, the search result is displayed on display 131 of terminal device 100, and the search processing ends.

With reference to FIG. 3 again, when the new analysis case data is added to analysis case database 310, learning unit 260 performs the machine learning using analysis case database 310 and updates language model 61. Vector generation unit 220 updates the vector of each of the plurality of analysis case data included in analysis case database 310 using updated language model 61.

When the new analysis case data is added to analysis case database 310, the vector of search query QRY and the vector of each of the plurality of analysis case data included in analysis case database 310 may change. Accordingly, even when the same search query QRY is used, the search result before the new analysis case data is added to analysis case database 310 may be different from the search result after the new analysis case data is added to analysis case database 310. Depending on the information added to analysis case database 310, the tendency of the information included in analysis case database 310 rapidly changes, and the analysis case data having a relatively low relevance to search query QRY may be ranked high.

So, when the new analysis case data is added to analysis case database 310, analysis case search system 1000 calculates the variation in the distribution of the frequency of the ranks of the plurality of analysis case data as the change in the statistical value representing the feature of the distribution using a plurality of predetermined test queries. According to analysis case search system 1000, the change in search performance can be quantitatively calculated, so that the degradation in the search performance can be automatically detected based on a predetermined criterion.

The first label includes the character string related to the specific analysis case data. For example, the first label includes the character string of the name of the compound to be analyzed or the character string of the name of a device that analyzes the compound, which is mainly described in the analysis case data.

The second label includes a character string representing a superordinate concept of the first label. When the first label includes the character string of the name of the compound, the second label includes the character string indicating a chemical or biological superordinate concept of the compound. For example, when the first label is "purine body" or "purine base", the second label may be "nucleic acid", "alkaloid" or "base". The first label and the second label of the specific analysis case data may be automatically attached to the specific analysis case data, or may be attached by the operator.

For example, when the first label is liquid chromatograph mass spectrometer (LCMS)-XYZW (XYZW is a model number of the device) as the character string of the name of the device, the second label may be quadrupole LC/MS, time-of-flight LC/MS, or simply LC/MS.

The first label and the second label are associated with each other by a concept related to the compound to be analyzed or the device that performs the analysis of the compound, so that the degradation in the performance of the document search with respect to the database in which document data including information related to chemical or biological analysis is accumulated can be detected with high accuracy.

FIG. 8 is a view illustrating a structure in which the first label, the second label, and an identifier of the specific analysis case data are associated, the structure being formed in test query database 320. As illustrated in FIG. 8, a first label Ca1 and a second label CA are attached to each of specific analysis case data Da11, Da12, Da13. A first label Ca2 and a second label CA are attached to each of specific analysis case data Da21, Da22, and Da23. The second label CA is a superordinate concept of first labels Ca1, Ca2, and includes first labels Ca1, Ca2. The first label "purine body" and the second label "nucleic acid" are attached to each of specific analysis case data D1, D3, D6. A first label Cb1 and the second label "nucleic acid" are attached to specific analysis case data D5. A first label Cb2 and the second label "nucleic acid" are attached to specific analysis case data D9. The "nucleic acid" is a superordinate concept of the "purine body" and first labels Cb1, Cb2, and includes the "purine body" and first labels Cb1, Cb2. Specific analysis case data D1, D3, D5, D6, D9 correspond to analysis case data D1, D3, D5, D6, D9 in FIGS. 5 and 6, respectively.

With reference to FIG. 3 again, vector generation unit 220 outputs notification in which the update of the vectors of the plurality of analysis case data included in analysis case database 310 is completed in association with the addition of the new analysis case data to analysis case database 310 to the performance evaluation unit 270. In response to the notification, performance evaluation unit 270 acquires the plurality of test queries from test query database 320, and searches the analysis case data in which each of the plurality of test queries is used as search query TQRY.

Performance evaluation unit 270 acquires ranking information RNK related to search query TQRY from search unit 230. Performance evaluation unit 270 counts the frequency of the ranking of each of the plurality of specific analysis case data in ranking information RNK related to the plurality of first labels in the plurality of test queries, and calculates a statistical value (first statistical value) related to the first label. Performance evaluation unit 270 counts the frequency of the ranking of each of the plurality of specific analysis case data in ranking information RNK related to the plurality of second labels in the plurality of test queries, and calculates a statistical value (second statistical value) related to the plurality of second labels. Each of the statistical value related to the first label and the statistical value related to the second label is stored in the storage in association with the timing at which the statistical value is calculated.

When the variation value of the statistical value related to the first label due to the update of language model 61 is larger than a predetermined threshold Th1 (first threshold value) and when the variation value of the statistical value related to the second label due to the update of language model 61 is larger than a predetermined threshold Th2 (second threshold value), performance evaluation unit 270 detects the gradation in the search performance. Thresholds Th1, Th2 can be appropriately determined by actual machine experiment or simulation. The variation value of the statistical value is an absolute value of a difference between the statistical value after the new analysis case data is added to analysis case database 310 and the statistical value before the new analysis case data is added to analysis case database 310. In the search performed by performance evaluation unit 270, processing similar to that in S20, S30 in FIG. 7 is performed.

It is assumed that the ranking of the search result when search query TQRY is the "purine body" of the first label is the same as the ranking in FIG. 5. With reference to FIGS. 8 and 5, the rankings of specific analysis case data D1, D3, D6 to which "purine body" is attached are first, third, and sixth, respectively. For this reason, the frequency of the first label of each of the first, third, and sixth labels is increased by 1. Similarly, when search query TQRY is first label Ca1, the frequency related to the first label of the ranking of each of specific analysis case data Da11, Da12, Da13 in the search result is increased by 1. When search query TQRY is first label Ca2, the frequency of the ranking related to the first label of each of specific analysis case data Da21, Da22, Da23 in the search result is increased by 1. When search query TQRY is first label Cb1, the frequency related to the first label of the rank of specific analysis case data D5 in the search result is increased by 1. When search query TQRY is first label Cb2, the frequency of the ranking related to the first label of specific analysis case data D9 in the search result is increased by 1.

It is assumed that the ranking of the search result when search query TQRY is the "nucleic acid" of the second label is the same as the ranking in FIG. 6. With reference to FIGS. 8 and 6, the rankings of specific analysis case data D1, D3, D5, D6, D9 to which the "nucleic acid" is attached are the second, fourth, first, sixth, and third positions, respectively. Accordingly, the frequency of the second label of each of the second, fourth, first, sixth, and third labels is increased by 1. When search query TQRY is second label CA, the frequency related to the second label of the ranking of each of specific analysis case data Da11, Da12, Da13, Da21, Da22, Da23 in the search result is increased by 1.

FIG. 9 is a view illustrating a distribution curve of a frequency of ranks of the plurality of specific analysis case data when each of a plurality of first labels is used as search query TQRY. In FIG. 9, a solid line indicates a distribution curve before the new analysis case data is added to analysis case database 310, and a dotted line indicates a distribution curve after the new analysis case data is added to analysis case database 310. In addition, in FIG. 9, a mode is used as the statistical value indicating the characteristic of the distribution. The same applies to FIG. 10. The statistical value representing the characteristic of the distribution may be a statistical value other than the mode, and for example, may be a median or an average value.

As illustrated in FIG. 9, the mode related to the first label before the new analysis case data is added to analysis case database 310 is Vs11. The mode related to the first label after the new analysis case data is added to analysis case database 310 is Vs12. The variation value of the mode for the first label is Vc1.

FIG. 10 is a view illustrating the distribution curve of the frequency of the ranks of the plurality of specific analysis case data when each of a plurality of second labels is used as search query TQRY. As illustrated in FIG. 10, the mode related to the second label before the new analysis case data is added to analysis case database 310 is Vs21. The mode related to the second label after the new analysis case data is added to analysis case database 310 is Vs22. The variation value of the mode for the second label is Vc2 (<Vc1).

The second label usually includes a plurality of first labels different from each other. The number of analysis case data to which the second label is attached is larger than the number of analysis case data to which the first label is attached, which is one of subordinate concepts of the second label. For this reason, the change in the ranking of the search results due to the update of language model 61 tends to be larger in the case of using the first label as the search query than in the case of using the second label as the search query. Desirably threshold Th1 of the statistical value related to the first label is larger than threshold Th2 of the statistical value related to the second label according to the ease of occurrence of the variation in the ranking of the search results due to the update of language model 61. Threshold Th1 is larger than Th2, an abnormality sign appearing in each of the variation of the statistical value related to the first label and the variation of the statistical value related to the second label can be consistently detected.

Figure 11:
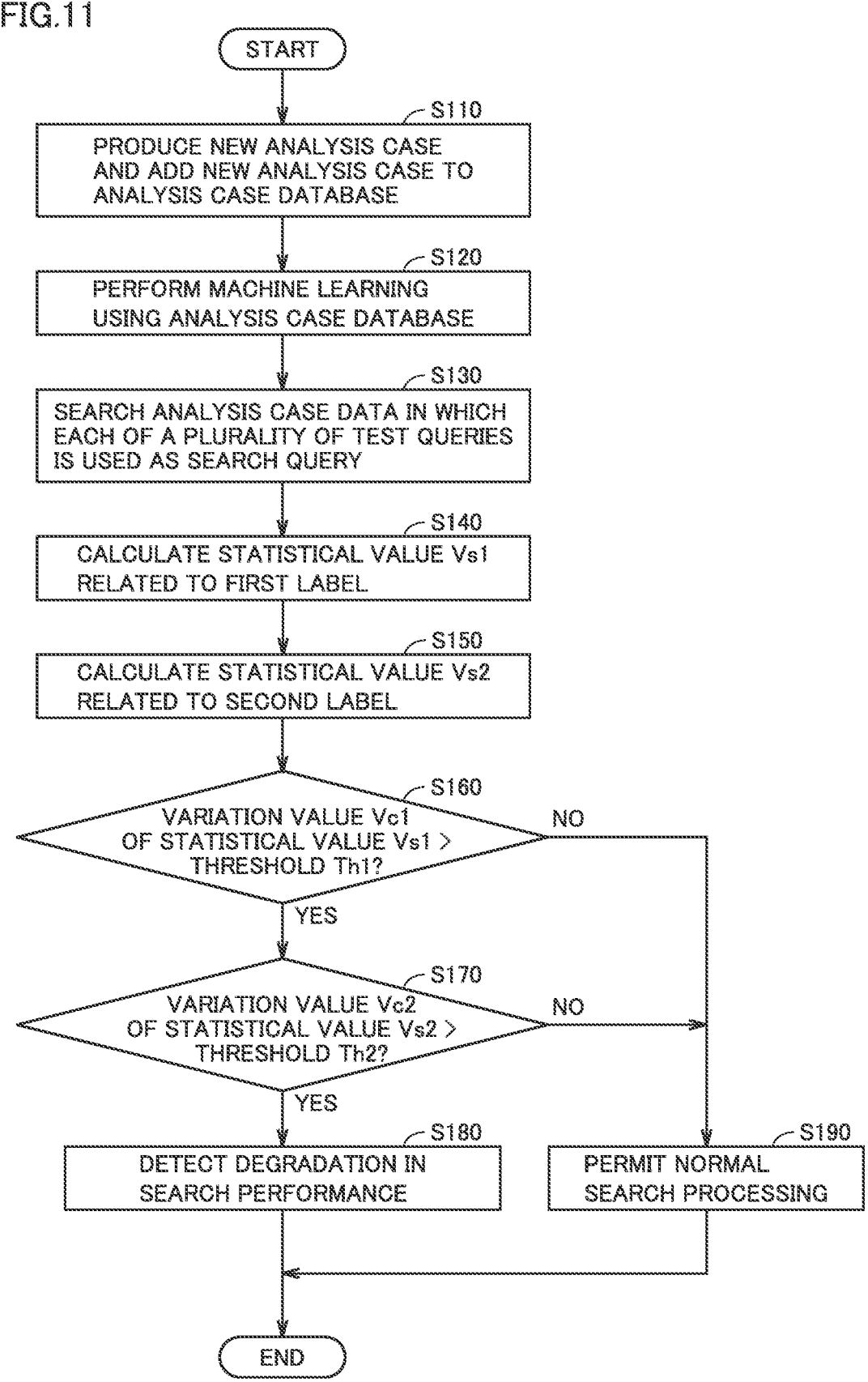
FIG. 11 is a view illustrating a schematic flow of performance evaluation processing performed by the server device in FIG. 3.

FIG. 11 is a view illustrating a schematic flow of performance evaluation processing performed by server device 200 in FIG. 3. As illustrated in FIG. 11, in S110, analysis case generation unit 280 adds the new analysis case data to analysis case database 310, and advances the processing to S120. In S120, learning unit 260 performs machine learning using analysis case database 310, updates the vector of each of the plurality of analysis case data included in language model 61 and analysis case database 310, and advances the processing to S130. In S130, search unit 230 searches the analysis case data in which each of the plurality of first labels and the plurality of second labels registered in test query database 320 is search query TQRY, and advances the processing to S140.

In S140, performance evaluation unit 270 calculates a statistical value Vs1 related to the first label from the search result of the analysis case data in which each of the plurality of first labels is search query TQRY, and advances the processing to S150. In S150, performance evaluation unit 270 calculates a statistical value Vs2 related to the second label from the search result of the analysis case data in which each of the plurality of second labels is search query TQRY, and advances the processing to S160.

In S160, performance evaluation unit 270 determines whether a variation value Vc1 of statistical value Vs1 is larger than a threshold Th1. When variation value Vc1 is less than or equal to threshold Th1 (NO in S160), performance evaluation unit 270 permits the start of the normal search processing in S190, and ends the processing. When variation value Vc1 is larger than threshold Th1 (YES in S160), performance evaluation unit 270 advances the processing to S170.

In S170, performance evaluation unit 270 determines whether a variation value Vc2 of statistical value Vs2 is larger than a threshold Th2. When variation value Vc2 is less than or equal to threshold Th2 (NO in S170), performance evaluation unit 270 permits the start of the normal search processing in S190, and ends the processing. When variation value Vc2 is larger than threshold Th2 (YES in S170), performance evaluation unit 270 detects the degradation in the search performance in S180, and ends the processing. In analysis case search system 1000, addition of the new analysis case data to analysis case database 310 is included in the performance evaluation processing, so that the addition of the new analysis case data to analysis case database 310 and performance evaluation of the document search can be integrally and continuously performed.

For example, the tendency of the analysis case data added to analysis case database 310 deviates from the tendency of the plurality of analysis case data already included in analysis case database 310, or the incompatibility between analysis case database 310 and the hyperparameter of the machine learning can be cited as the cause of the degradation in the search performance. When the degradation in the search performance is detected, a predetermined related person (for example, an administrator of the analysis case search system 1000) is notified of the degradation in the detection performance. When the degradation in the search performance is detected, the analysis case data added from analysis case database 310 may be deleted, and the vector of each of language model 61 and the plurality of analysis case data before the analysis case data is added may be used to search for the analysis case data.

Figure 12:
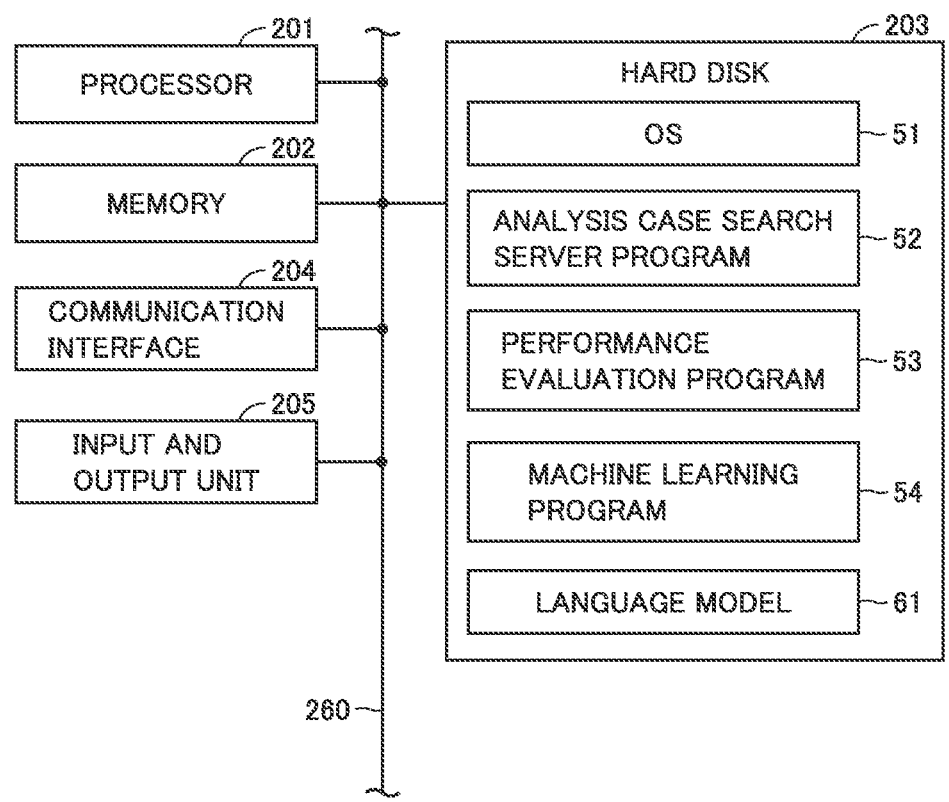
FIG. 12 is a block diagram illustrating a hardware configuration of the server device in FIG. 3.

FIG. 12 is a block diagram illustrating a hardware configuration of server device 200 in FIG. 3. As illustrated in FIG. 12, server device 200 includes a processor 201, a memory 202 and a hard disk 203 as a storage, a communication interface 204 as a communication unit 210, and an input and output unit 205. These are communicably connected to each other through a bus 206.

Hard disk 203 is a non-volatile storage device. For example, hard disk 203 stores an operating system (OS) program 51, an analysis case search server program 52, a performance evaluation program 53, a machine learning program 54, and a language model 61. In addition to the data in FIG. 12, for example, settings and outputs of various applications (for example, a statistical value related to the first label and a statistical value related to the second label) are stored in hard disk 203. Memory 202 is typically a volatile storage device such as a dynamic random access memory (DRAM).

Processor 201 includes a central processing unit (CPU). Processor 201 may further include a graphics processing unit (GPU). Processor 201 reads a program stored in hard disk 203 into memory 202 and executes the program to implement various functions of server device 200. For example, processor 201 that executes analysis case search server program 52 functions as a vector generation unit 220, a search unit 230, a display controller 250, and an analysis case generation unit 280. Processor 201 that executes performance evaluation program 53 functions as vector generation unit 220 and a performance evaluation unit 270. Processor 201 that executes machine learning program 54 functions as vector generation unit 220 and a learning unit 260. Processor 201 is connected to network NW through communication interface 204.

In the embodiment, the system in which vector generation unit 220, search unit 230, display controller 250, learning unit 260, performance evaluation unit 270, and analysis case generation unit 280 are formed in server device 200 different from terminal device 100 to which the user inputs the search query has been described. The vector generation unit, the search unit, the display control unit, the learning unit, the performance evaluation unit, and the analysis case generation unit may be formed in the device to which the user inputs the search query.

Figure 13:
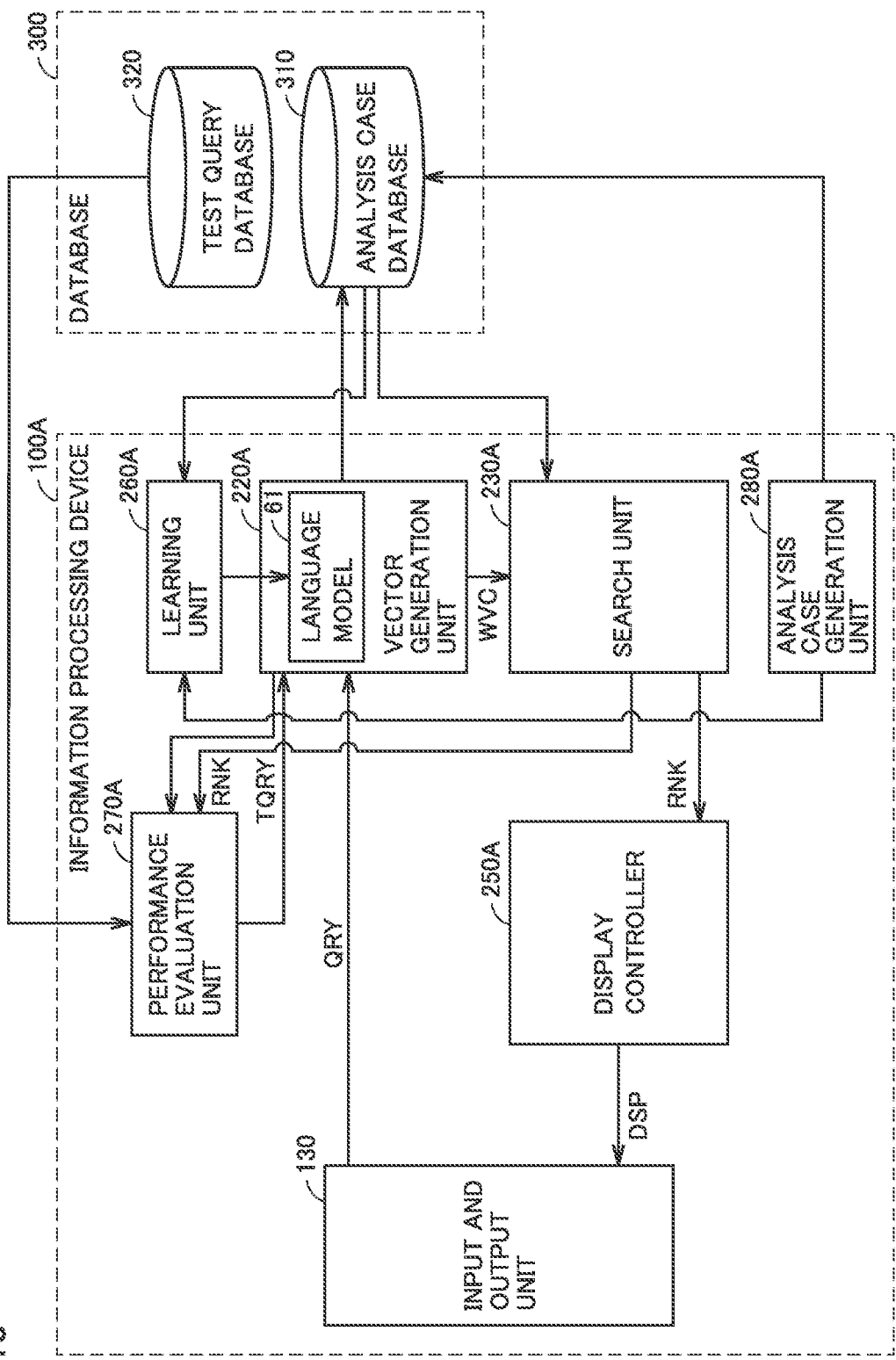
FIG. 13 is a block diagram illustrating a configuration of an information processing device according to a modification of the embodiment.

FIG. 13 is a block diagram illustrating a configuration of an information processing device 100A according to a modification of the embodiment. As illustrated in FIG. 13, information processing device 100A includes a vector generation unit 220A, a search unit 230A, a display controller 250A, a learning unit 260A, a performance evaluation unit 270A, and an analysis case generation unit 280A. Vector generation unit 220A, search unit 230A, display controller 250A, learning unit 260A, performance evaluation unit 270A, and analysis case generation unit 280A have functions similar to those of vector generation unit 220, search unit 230, display controller 250, learning unit 260, performance evaluation unit 270, and analysis case generation unit 280 in FIG. 3, so that the description of the functions will not be repeated. Database 300 is connected to information processing device 100A.

Figure 14:
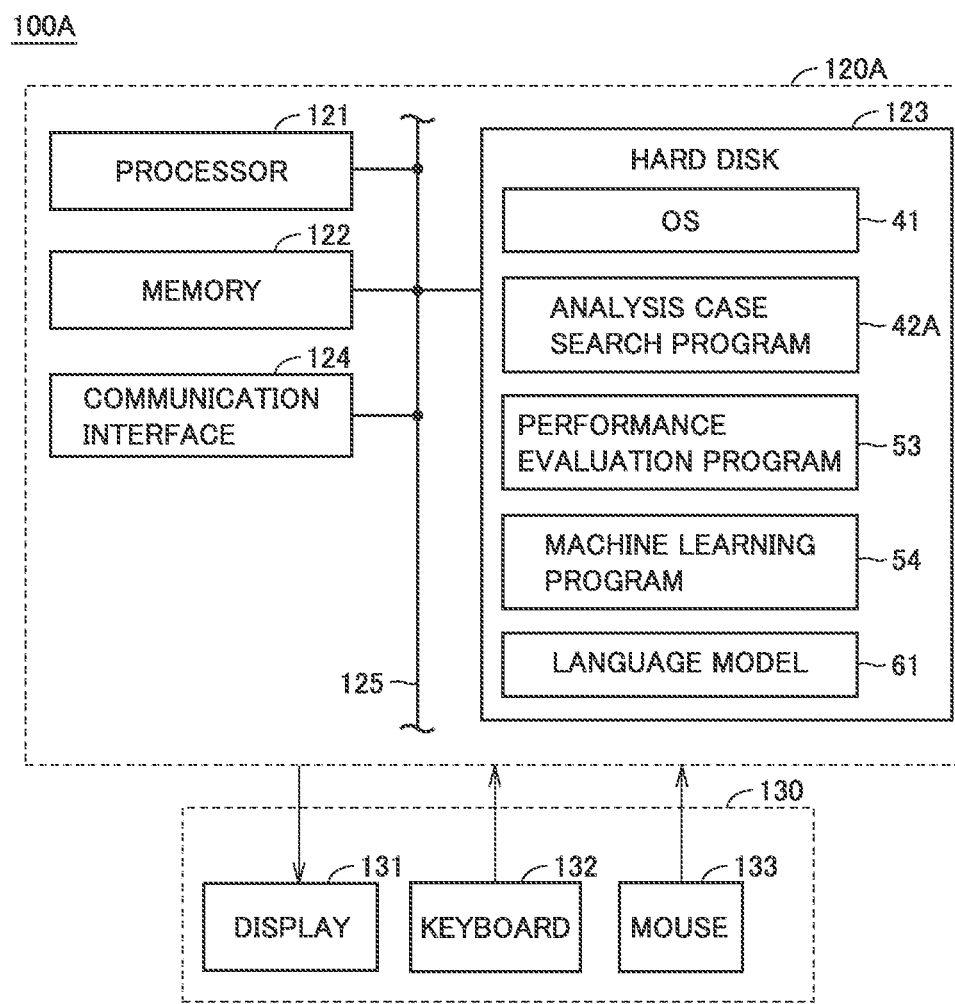
FIG. 14 is a block diagram illustrating a hardware configuration of the information processing device in FIG. 13.

FIG. 14 is a block diagram illustrating a hardware configuration of information processing device 100A in FIG. 13. The hardware configuration of information processing device 100A is a configuration in which performance evaluation program 53, machine learning program 54, and language model 61 in FIG. 12 are added to hard disk 123 in FIG. 2, and analysis case search client program 42 is replaced with an analysis case search program 42A. The other configurations are the same, and the description thereof will not be repeated.

As illustrated in FIG. 14, processor 121 that executes the analysis case search program 42A functions as vector generation unit 220A, search unit 230A, display controller 250A, and analysis case generation unit 280A. Processor 121 that executes performance evaluation program 53 functions as vector generation unit 220A and performance evaluation unit 270A. Processor 121 that executes machine learning program 54 functions as vector generation unit 220A and learning unit 260A.

As described above, according to the system and method of the embodiment and the device of the modification, the degradation in the performance of the document search can be automatically detected.

ASPECTS

It is understood by those skilled in the art that the embodiment described above is a specific example of the following aspects.
(Item 1)
A method according to one aspect searches a plurality of related document data related to a search query from a database including a plurality of document data, and evaluates performance of document search ranking the plurality of related document data in accordance with a relevance degree between each of the plurality of related document data and the search query. The relevance degree is calculated based on a feature of each of the plurality of document data extracted by a language model generated by machine learning using the database and a feature of the search query extracted by the language model. A first label related to the specific document data and a second label that is a superordinate concept of the first label is previously attached to each of a plurality of specific document data included in the plurality of document data. The method includes: updating the language model by the machine learning when at least one piece of document data is added to the database; calculating a first statistical value related to a ranking of each of the plurality of specific document data from a result of the document search in which each of a plurality of first labels attached to the plurality of specific document data is used as the search query; calculating a second statistical value related to a ranking of each of the plurality of specific document data from a result of the document search in which each of a plurality of second labels attached to the plurality of specific document data is used as the search query; and detecting degradation in the performance when a variation value of the first statistic value due to the update of the language model in association with the addition of the at least one document data is greater than a first threshold and when a variation value of the second statistic value due to the update is greater than a second threshold.

According to the method described in item 1, when the variation value of the first statistical value due to the update of the language model in association with the addition of at least one document data is larger than the first threshold and when the variation value of the second statistical value due to the update is larger than the second threshold, the degradation in the performance of the document search is detected, whereby the degradation in the performance of the document search can be automatically detected.

(Item 2)
In the method described in item 1, the first label includes a character string indicating the name of the compound to be analyzed in the specific document data to which the first label is attached. The second label includes the character string indicating a chemical or biological superordinate concept of the compound.

According to the method described in item 2, the first label and the second label are associated with each other by a concept related to the compound to be analyzed, so that the degradation in the performance of the document search with respect to the database in which document data including information related to chemical or biological analysis is accumulated can be detected with high accuracy.
(Item 3)
In the method described in item 1 or 2, the language model is capable of generating a distributed representation of each of a word and a sentence included in the plurality of document data and a distributed representation of each of the plurality of document data. The relevance degree is calculated using a distance between the distributed representation of each of the plurality of related document data and the distributed representation of the search query.

According to the method described in item 3, the relevance degree between each of the plurality of related document data and the search query is calculated using the distance between the distributed representation of the related document data and the distributed representation of the search query, whereby the relevance degree can be calculated as an index representing semantic closeness between the search query and each of the plurality of related document data.
(Item 4)
In the method described in item 3, the relevance degree between each of the plurality of related document data and the search query is calculated based on the distance between the distributed representation of the related document data and the distributed representation of the search query and a number of search queries included in the related document data.

According to the method described in item 4, clarity of the search basis can be improved by also using the number of search queries included in the related document data in calculating the relevance degree.
(Item 5)
The method described in any one of items 1 to 4 includes adding at least one document data to a database.

According to the method described in item 5, the addition of the new document data to the database and performance evaluation of the document search can be performed integrally and continuously.
(Item 6)
In the method described in any one of items 1 to 5, the first threshold is greater than the second threshold.

According to the method described in item 6, a sign of abnormality appearing in each of the variation of the first statistical value and the variation of the second statistical value can be consistently detected.
(Item 7)
A system according to one aspect searches a plurality of related document data related to a search query from a database including a plurality of document data, and evaluates performance of document search ranking the plurality of related document data in accordance with a relevance degree between each of the plurality of related document data and the search query. The relevance degree is calculated based on a feature of each of the plurality of document data extracted by a language model generated by machine learning using the database and a feature of the search query extracted by the language model. A first label related to the specific document data and a second label that is a superordinate concept of the first label is previously attached to each of a plurality of specific document data included in the plurality of document data. The system includes a terminal device and a server device. A search query is input to the terminal device. The server device receives the search query from the terminal device to perform the document search. The server device includes a learning unit and a performance evaluation unit. When at least one piece of document data is added to the database, the learning unit updates the language model by machine learning. The performance evaluation unit evaluates the performance of the document search. The performance evaluation unit calculates a first statistical value related to a ranking of each of the plurality of specific document data from a result of the document search in which each of a plurality of first labels attached to the plurality of specific document data is used as the search query. The performance evaluation unit calculates a second statistical value related to a ranking of each of the plurality of specific document data from a result of the document search in which each of a plurality of second labels attached to the plurality of specific document data is used as the search query. The performance evaluation unit detects degradation in the performance when a variation value of the first statistic value due to the update of the language model in association with the addition of the at least one document data is greater than a first threshold and when a variation value of the second statistic value due to the update is greater than a second threshold.

According to the system described in item 7, when the variation value of the first statistical value due to the update of the language model in association with the addition of at least one document data is larger than the first threshold and when the variation value of the second statistical value due to the update is larger than the second threshold, the degradation in the performance of the document search is detected, whereby the degradation in the performance of the document search can be automatically detected.

(Item 8)

A device according to one aspect searches a plurality of related document data related to a search query from a database including a plurality of document data, and evaluates performance of document search ranking the plurality of related document data in accordance with a relevance degree between each of the plurality of related document data and the search query. The relevance degree is calculated based on a feature of each of the plurality of document data extracted by a language model generated by machine learning using the database and a feature of the search query extracted by the language model. A first label related to the specific document data and a second label that is a superordinate concept of the first label is previously attached to each of a plurality of specific document data included in the plurality of document data. The device includes an input and output unit, a search unit, a learning unit, and a performance evaluation unit. The search query is input to the input and output unit. The search unit receives the search query to perform the document search. When at least one piece of document data is added to the database, the learning unit updates the language model by machine learning. The performance evaluation unit evaluates the performance of the document search. The performance evaluation unit calculates a first statistical value related to a ranking of each of the plurality of specific document data from a result of the document search in which each of a plurality of first labels attached to the plurality of specific document data is used as the search query. The performance evaluation unit calculates a second statistical value related to a ranking of each of the plurality of specific document data from a result of the document search in which each of a plurality of second labels attached to the plurality of specific document data is used as the search query. The performance evaluation unit detects degradation in the performance when a variation value of the first statistic value due to the update of the language model in association with the addition of the at least one document data is greater than a first threshold and when a variation value of the second statistic value due to the update is greater than a second threshold.

According to the device described in item 8, when the variation value of the first statistical value due to the update of the language model in association with the addition of at least one document data is larger than the first threshold and when the variation value of the second statistical value due to the update is larger than the second threshold, the degradation in the performance of the document search is detected, whereby the degradation in the performance of the document search can be automatically detected.

For the above-described embodiment and modification, it is planned from the beginning of the application to appropriately combine the configurations described in the embodiment within a range in which no inconvenience or contradiction occurs including combinations not mentioned in the specification.

It should be considered that the disclosed embodiment is an example in all respects and not restrictive. The scope of the present invention is defined by not the description above, but the claims, and it is intended that all modifications within the meaning and scope of the claims and their equivalents are included in the present invention.

REFERENCE SIGNS LIST

61: language model, 100: terminal device, 100A: information processing device, 120: computer, 121, 201: processor, 122, 202: memory, 123, 203: hard disk, 124, 204: communication interface, 125, 206: bus, 130, 205: input and output unit, 131: display, 132: keyboard, 133: mouse, 200: server device, 210: communication unit, 220, 220A: vector generation unit, 230, 230A: search unit, 250, 250A: display controller, 260, 260A: learning unit, 270, 270A: performance evaluation unit, 280, 280A: analysis case generation unit, 300: database, 310: analysis case database, 320: test query database, 1000: analysis case search system, CA: second label, Ca1, Ca2, Cb1, Cb2: first label, D1, D2, D3, D4, D5, D6, D8, D9, D10, D11: analysis case database, NW: network, QRY, TQRY: search query, Th1, Th2: threshold, Vc1, Vc2: variation value, Vs1, Vs2: statistical value, WVC: word vector.

The invention claimed is:

1. A method for searching a plurality of related document data related to a search query from a database including a plurality of document data, and evaluating performance of document search ranking the plurality of related document data in accordance with a relevance degree between each of the plurality of related document data and the search query, the relevance degree being calculated based on a feature of each of the plurality of document data extracted by a language model generated by machine learning using the database and a feature of the search query extracted by the language model, a first label and a second label that is a superordinate concept of the first label being previously attached to each of a plurality of specific document data included in the plurality of document data, the first label being related to the specific document data to which it is attached, the method comprising:

updating the language model by the machine learning when at least one piece of document data is added to the database;

calculating a first statistical value related to a ranking of each of the plurality of specific document data from a result of the document search in which each of a plurality of first labels attached to the plurality of specific document data is used as the search query;

calculating a second statistical value related to a ranking of each of the plurality of specific document data from a result of the document search in which each of a plurality of second labels attached to the plurality of specific document data is used as the search query; and detecting degradation in the performance when a variation value of the first statistic value due to the update of the language model in association with the addition of the at least one document data is greater than a first threshold and when a variation value of the second statistic value due to the update is greater than a second threshold, wherein, when the degradation in the search performance is detected, the method comprises using the language model before the at least one piece of document data is added for the document search.

2. The method according to claim 1, wherein the first label includes a character string indicating a name of a compound to be analyzed in the specific document data to which the first label is attached, and the second label includes a character string indicating a chemical or biological superordinate concept of the compound.

3. The method according to claim 1, wherein the language model is capable of generating a distributed representation of each of a word and a sentence included in the plurality of document data and a distributed representation of each of the plurality of document data, and the relevance degree is calculated using a distance between the distributed representation of each of the plurality of related document data and the distributed representation of the search query.

4. The method according to claim 3, wherein the relevance degree is calculated based on the distance and a number of the search queries included in each of the plurality of related document data.

5. The method according to claim 1, further comprising adding the at least one document data to the database.

6. The method according to claim 1, wherein the first threshold is larger than the second threshold.

7. A system searching a plurality of related document data related to a search query from a database including a plurality of document data, and evaluating performance of document search ranking the plurality of related document data in accordance with a relevance degree between each of the plurality of related document data and the search query, the relevance degree being calculated based on a feature of each of the plurality of document data extracted by a language model generated by machine learning using the database and a feature of the search query extracted by the language model, a first label and a second label that is a superordinate concept of the first label being previously attached to each of a plurality of specific document data included in the plurality of document data, the first label being related to the specific document data to which it is attached, the system comprising:

a terminal device to which the search query is input; and a server device that receives the search query from the terminal device to perform the document search, wherein the server device includes:

a learning unit that updates the language model by the machine learning when at least one piece of document data is added to the database; and a performance evaluation unit that evaluates the performance, and the performance evaluation unit calculates a first statistical value related to a ranking of each of the plurality of specific document data from a result of the document search in which each of a plurality of first labels attached to the plurality of specific document data is used as the search query, calculates a second statistical value related to a ranking of each of the plurality of specific document data from a result of the document search in which each of a plurality of second labels attached to the plurality of specific document data is used as the search query, and detects degradation in the performance when a variation value of the first statistic value due to the update of the language model in association with the addition of the at least one document data is greater than a first threshold and when a variation value of the second statistic value due to the update is greater than a second threshold, wherein, when the degradation in the search performance is detected, the server device uses the language model before the at least one piece of document data is added for the document search.

8. A device searching a plurality of related document data related to a search query from a database including a plurality of document data, and evaluating performance of document search ranking the plurality of related document data in accordance with a relevance degree between each of the plurality of related document data and the search query, the relevance degree being calculated based on a feature of each of the plurality of document data extracted by a language model generated by machine learning using the database and a feature of the search query extracted by the language model, a first label and a second label that is a superordinate concept of the first label being previously attached to each of a plurality of specific document data included in the plurality of document data, the first label being related to the specific document data to which it is attached, the device comprising:

an input and output unit to which the search query is input; and a processor configured to:

receive the search query to perform the document search; and update the language model by the machine learning when at least one piece of document data is added to the database, wherein the processor is configured to:

calculate a first statistical value related to a ranking of each of the plurality of specific document data from a result of the document search in which each of a plurality of first labels attached to the plurality of specific document data is used as the search query;

calculate a second statistical value related to a ranking of each of the plurality of specific document data from a result of the document search in which each of a plurality of second labels attached to the plurality of specific document data is used as the search query; and detect degradation in the performance when a variation value of the first statistic value due to the update of the language model in association with the addition of the at least one document data is greater than a first threshold and when a variation value of the second statistic value due to the update is greater than a second threshold, wherein, when the degradation in the search performance is detected, the device, uses the language model before the at least one piece of document data is added for the document search.

* * * * *